United States Patent [19]
Lake

[11] Patent Number: 5,608,465
[45] Date of Patent: Mar. 4, 1997

[54] VIDEO MIXER CONTROL SIGNAL GENERATOR MODULAR ELEMENT

[75] Inventor: David E. Lake, Grass Valley, Calif.

[73] Assignee: Scitex Im Acquisition Corp., Bedford, Mass.

[21] Appl. No.: 187,831

[22] Filed: Jan. 28, 1994

[51] Int. Cl.⁶ .............................. H04N 9/76; H04N 5/262
[52] U.S. Cl. ............................. 348/584; 348/594
[58] Field of Search .................... 348/584, 594, 348/571, 598, 593, 589; H04N 9/76, 5/265, 5/275, 5/262

[56] References Cited

U.S. PATENT DOCUMENTS 4,963,977  10/1990  Jackson et al. ................... 348/594
5,412,479  5/1995  Aligi et al. ......................... 348/594

FOREIGN PATENT DOCUMENTS 03136480  6/1991  Japan .............................. H04N 5/265
03154568  7/1991  Japan .............................. H04N 1/387

Primary Examiner—Victor R. Kostak
Assistant Examiner—Nathan J. Flynn
Attorney, Agent, or Firm—Limbach & Limbach L.L.P.

[57] ABSTRACT

With an elemental approach for producing a wipe surface, one or more identical wipe surface generator modular elements are cascaded together. Each element produces an elementary wipe surface, and the elementary wipe surface is cascaded to a next modular element to generate a complex wipe surface from a combination of the elementary wipe surfaces. A control signal generator receives the complex wipe surface and generates a video mixer control signal, α, based on the complex wipe surface.

19 Claims, 3 Drawing Sheets

VIDEO MIXER CONTROL SIGNAL GENERATOR MODULAR ELEMENT

TECHNICAL FIELD OF THE INVENTION

The invention relates to video mixer control signal generators for a wipe surface and for generating a video mixer control signal corresponding thereto. More specifically, the invention is a generic video mixer control signal generator modular element which alone, or in combination with other modular elements, generates a relatively complex wipe surface and a corresponding video mixer control signal.

BACKGROUND OF THE INVENTION

Throughout the specification (including in the claims) the terms "video data" and "video signal" are used to denote any of the broad class of image signals indicative of pixels of an image, including analog image signals and digital image signals.

A video mixer selectively combines pixels of a first video signal with pixels of a second video signal, responsive to a video mixer control signal, to produce pixels of a composite video signal. The composite video pixels have values $v_{h,v}= (1-\alpha_{h,v})a_{h,v}+(\alpha_{h,v})b_{h,v}$. "h" and "v" represent the pixel horizontal and vertical coordinates, respectively. $\alpha_{h,v}$ represents the video mixer control signal values. Each video mixer control signal value $\alpha_{h,v}$ has a value in the range from 0 to 1.0, which may be represented as a fixed point fractional value. $a_{h,v}$ represents the pixel values of the first video signal and $b_{h,v}$ represents the pixel values of the second video signal.

In typical embodiments, the first and second video signals are color video signals whose color components (e.g., red, green, and blue components, or luminance and chrominance components) are multiplexed according to the well known CCIR 601 standard (or the well known SMPTE/EBU recommended practice known as RP125).

A wipe surface is a data stream representing a geometric shape from which the video mixer control signal α is generated. That is, the data value of a point on the wipe surface determines the video mixer control signal value $\alpha_{h,v}$ for a pixel h,v of the composite image which corresponds to the point on the wipe surface. A wipe surface may be formed, for example, by a function z(h, v), where h and v are the horizontal and vertical coordinates of a display device, such as a video raster, on which the composite image is to be displayed. A wipe surface 20 is shown in a constant v cross-section, i.e. as a function of h only, in FIG. 1A, and the corresponding video mixer control signal α, generated from the wipe surface 20, is shown in FIG. 1B.

$\alpha_{h,v}$'s for pixels h,v, in the composite video image, which correspond to points on the wipe surface below a lower threshold plane 22 are set to 0.0. That is, $v_{h,v}$ for these pixels is comprised of $a_{h,v}$ only. $\alpha_{h,v}$'s for pixels h,v, in the composite video image, corresponding to points on the wipe surface above an upper threshold plane 24 are set to 1.0. That is, $v_{h,v}$ for these pixels is comprised of $b_{h,v}$ only. The upper threshold surface is above the lower threshold surface at all points. An upper threshold plane may be generated, for example, by adding some constant (delta) to points on a lower threshold plane, such as is shown in FIG. 1A.

$\alpha_{h,v}$'s for pixels h,v, in the composite video image, correspond to points on the wipe surface above the lower threshold surface 22 and above the upper threshold surface 24 are set to a value between 0.0 and 1.0. That is, $v_{h,v}$ for these pixels is comprised of a combination of $a_{h,v}$ and $b_{h,v}$. The closer a point on the wipe surface 20 between the lower threshold surface 22 and the upper threshold surface 24 is to the lower threshold surface 22, the closer the corresponding α value is to 0.0. Similarly, the closer such a point on the wipe surface 20 is to the upper threshold surface 24, the closer the corresponding α value is to 1.0.

Wipe pattern generation systems are comprised of basic circuit elements. For example, analog circuit implementations have employed operational amplifiers, integrators, two and four quadrant multipliers, and voltage comparators. Digital circuit implementations have employed logic elements such as multipliers, accumulators, digital switches, and comparators.

A conventional wipe surface generation system employs a fixed combination of basic circuit elements to generate an a priori determined wipe surface. A disadvantage of the conventional wipe surface generation system is its lack of flexibility, since the generated wipe surface is a priori determined.

SUMMARY OF THE INVENTION

In accordance with an embodiment of the present invention, a wipe generator modular element is provided. The wipe generator modular element comprises an internal wipe surface generator, for internally generating an internally generated wipe surface, and an external wipe surface receiving means, for receiving an externally generated wipe surface. An internal/external surface combiner is for combining the internally generated wipe surface with the externally generated wipe surface to produce a combined wipe surface. An output terminal provides the combined wipe surface from the wipe generator modular element. A complex wipe surface may be generated by combining a plurality of the modular elements.

The modular elements are preferably implemented in an Application Specific Integrated Circuit ("ASIC").

In a preferred embodiment of the present invention, a second output terminal is provided from the internal wipe surface generator for passing unprocessed surfaces (i.e. display device coordinates) to a specialized wipe generator device. A wipe surface generated by a specialized device may be brought back into the external wipe surface receiving means of the same or another modular element for further processing.

A modular element in accordance with the present invention is sufficient by itself for generating simple wipe patterns, and it can be combined with other similar modular elements and/or specialized wipe surface generators to provide more sophisticated wipe surfaces. With the modularization of the present invention, it is now possible to create wipe generator circuit boards which can accommodate multiple elements, some of which may not be installed. This allows a wipe generator system to be upgraded incrementally for performance enhancement.

A better understanding of the features and advantages of the invention will be obtained by reference to the following detailed description and accompanying drawings which set forth an illustrative embodiment in which the principles of the invention are utilized.

DETAILED DESCRIPTION OF THE INVENTION

Figure 2:
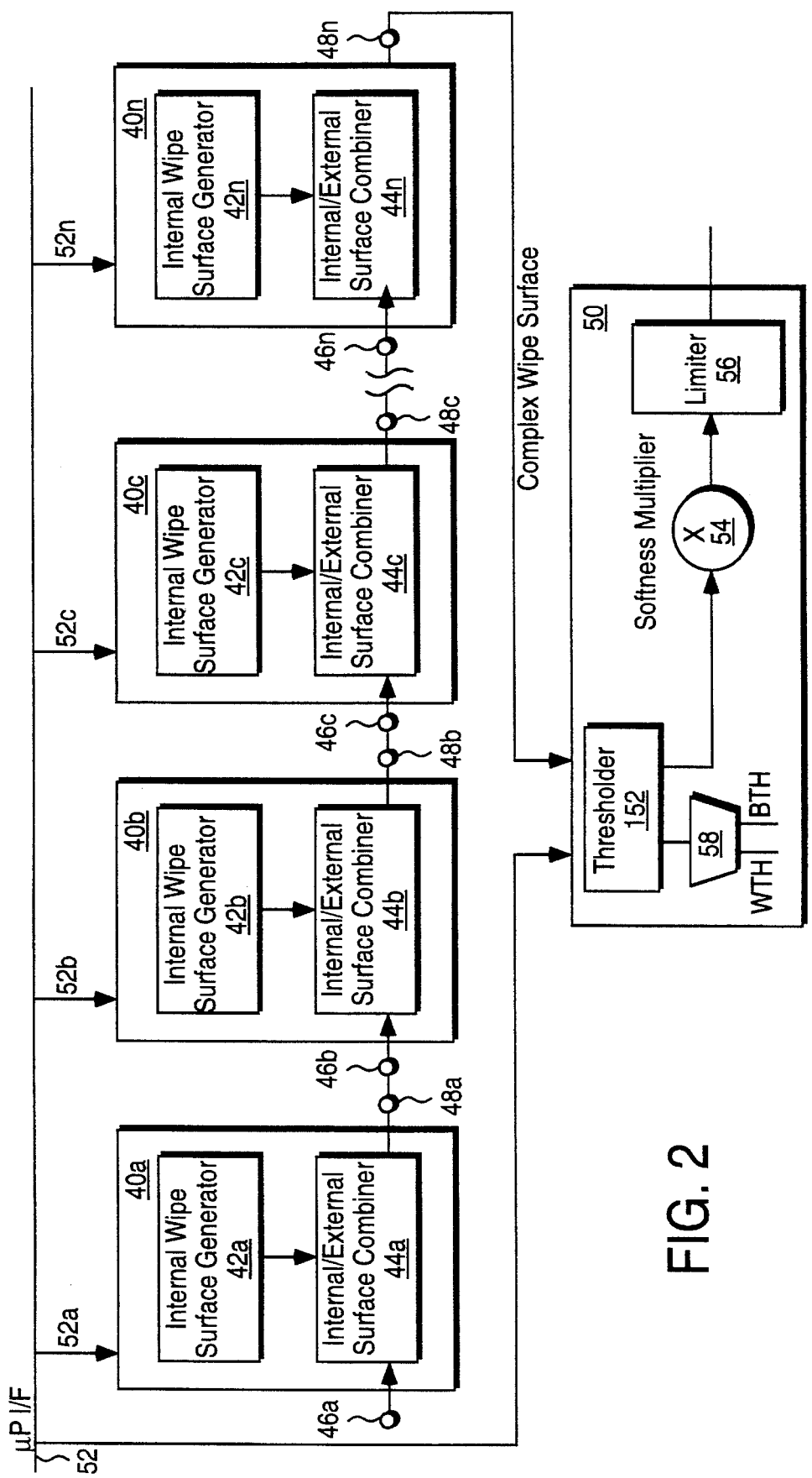
FIG. 2 illustrates an elemental approach for generating a wipe surface using wipe surface generator modular elements and a control signal generator element in accordance with an embodiment of the present invention.

The inventor has recognized the advantage to using an elemental approach for producing a wipe surface. FIG. 2 illustrates such an approach. One or more identical wipe surface generator modular elements $40a$–$40n$ are cascaded together. In a preferred embodiment, the modular elements are implemented in an Application Specific Integrated Circuit ("ASIC"). Each element produces an elementary wipe surface, and the elementary wipe surface is cascaded to a next modular element to generate a complex wipe surface from a combination of the elementary wipe surfaces. A control signal generator 50 receives the complex wipe surface and generates a video mixer control signal, α, based on the complex wipe surface.

Since the complex wipe surface generator modular elements $40a$–$40n$ are identical, they are described with respect to wipe surface generator modular element $40b$ only. Wipe surface generator modular element $40b$ includes an internal wipe surface generator $42b$ for internally generating a wipe surface based on internal wipe generator parameters provided to it by, for example, a microprocessor (not shown) via a microprocessor interface 52. Of course, each wipe surface modular element $40a$–$40n$ can be provided with a different set of wipe generator parameters so that each internal wipe surface generator $42a$–$42n$ can generate a wipe surface different from the wipe surfaces generated by the internal wipe surface generators of the other modular elements.

An externally (to the modular element $40b$) generated wipe surface, e.g a wipe surface generated by wipe surface modular element $40a$, may be input to an external/internal surface combiner $44b$ of the wipe generator modular element $40b$ via an external wipe surface input (EWSI) terminal $46b$, as shown in FIG. 2.

The external/internal surface combiner $44b$ combines the internally generated wipe surface with the externally generated wipe surface to produce a combined wipe surface at an output terminal $48b$. The external/internal surface combiner $44b$ operates in one of a number of modes. In a preferred embodiment, the external/internal surface combiner mode is selected by the microprocessor via the microprocessor interface 52.

For example, in a first mode, the internal/external surface combiner $44b$ produces a combined wipe surface that is the internally generated wipe surface only. In a second mode, the internal/external surface combiner $44b$ produces a combined wipe surface that is the externally generated wipe surface only. In a third mode, the internal/external surface combiner means produces a combined wipe surface that at each point is the maximum of the internally generated wipe surface and the externally generated wipe surface. Finally, in a fourth mode, the internal/external surface combiner produces a combined wipe surface that at each point is the minimum of the internally generated wipe surface and the externally generated wipe surface. One skilled in the art will realize that the above-mentioned four modes are not exclusive.

The collection of cascaded modular elements work together to produce a complex wipe surface. The internal wipe surface generator of modular element $40a$ is programmed by the microprocessor, via the microprocessor interface 52, to generate a first elementary wipe surface. Since the modular element $40a$ is the first in the cascade, nothing is input to the EWSI, and the internal/external surface combiner $44a$ is set to produce a first combined wipe surface that is the internally generated wipe surface only. The first combined wipe surface is provided to the output terminal $48a$.

The internal wipe surface generator of modular element $40b$ is programmed by the microprocessor, via the microprocessor interface 52, to generate a second elementary wipe surface. The first combined wipe surface, from the output terminal $48a$, is provided to the EWSI $46b$ of the modular element $40b$. The internal/external surface combiner $44b$ is set, for example, to operate in the above-described second mode, to produce a second combined wipe surface that at each point is the maximum of the second internally generated wipe surface and the first combined wipe surface, to produce a second combined wipe surface that is the maximum of the second internally generated wipe surface and the first combined wipe Surface. The second combined wipe surface is provided to the output terminal $48b$.

In this fashion, as the composite wipe surface is cascaded downstream, down the chain of modular elements, a more and more complex wipe surface results. The final combined wipe surface, the desired complex wipe surface, is provided from the output port $48n$ of the last modular element $40n$ in the chain to an input of the control signal generator 50.

The control signal generator 50 generates, from the final combined wipe surface, a video mixer control signal. A thresholder 152, rather than moving the upper and lower threshold planes with respect to the complex wipe surface, instead keeps the lower threshold plane fixed at z=0 and the upper threshold plane fixed at z=1, and shifts the wipe surface along the z axis. Adding the negative of the desired lower threshold plane z value to the complex wipe surface with an adder circuit accomplishes the downward shift.

Next, to accommodate the fixed distance between the lower and upper threshold planes, a softener 54 multiplies the shifted surface by a scaling multiplier, or softness gain value, to stretch or compress the surface, which has the same effect as shifting the upper threshold plane. That is, if the wipe surface is stretched vertically, it passes through the region between the upper and lower threshold planes at a greater slope, therefore projecting a narrower transition region onto the xy image plane. Similarly, if the wipe surface is compressed vertically, it passes through the region between the upper and lower threshold planes at a smaller slope, therefore projecting a wider transition region onto the xy image plane. It is the width of this transition region that determines the area of blending of the first and second video signal in the composite video signal. The narrower the region, the smaller the area of blending in the composite video signal, which results in a "hard" blend. The wider the region, the larger the area of blending in the composite video signal, which results in a "soft" blend.

In a preferred embodiment, the softness gain value is represented as a quasi-floating point multiplier, i.e. in a scaled integer format, with a mantissa field and an implied exponent field. The multiplication is then performed in a quasi-floating point manner. That is, the thresholded surface is multiplied by the mantissa, and a barrel shifter is employed to shift the result the number of bits in the implied exponent field.

Finally, a limiter circuit 56 clips the shifted wipe surface to be within the region between the z=0 and z=1 planes. That is, points on the shifted wipe surface below the z=0 plane are set to 0, and points on the shifted wipe surface above the z=1 plane are set to 1. The limiter circuit 56 leaves unchanged other points on the surface. This bounds the output video mixer control signal into a range useful for most video mixer circuits.

In many cases it is desirable to employ the same wipe surface to drive a first video mixer for wipe control and a second video mixer for border control. The border control signal is identical to the wipe pattern signal except it is slightly larger. Thus, in accordance with a preferred embodiment of the present invention, both a wipe control video mixer signal and a border control video mixer signal are obtained by simply performing the same control signal generation operations for both, but with the wipe surface shifted some amount higher in z for the border control signal than for the wipe control signal, to create a slightly larger pattern for the border.

A multiplexer 58 multiplexes the two threshold values, the wipe lower threshold value and the border lower threshold value, into the thresholder so that both the wipe mixer control signal and the border mixer control signal are derived in the same control signal generator 50 hardware. It is trivial to demultiplex the multiplexed control signal to isolate the control signals for the two mixers, and the advantage of using the same hardware to generate both control signals is a reduction of arithmetic hardware and signal wires.

The inventor recognized that by placing a control signal generator in each modular element, all modular elements of a wipe generator system can be identical. Of course, "upstream" modules can defeat the action of the control signal generator. First, the action of the thresholder can be defeated by using, for the thresholder, a lower threshold value of zero. The softness multiplier can be defeated by using a softness gain value of 1.0.

Figure 3:
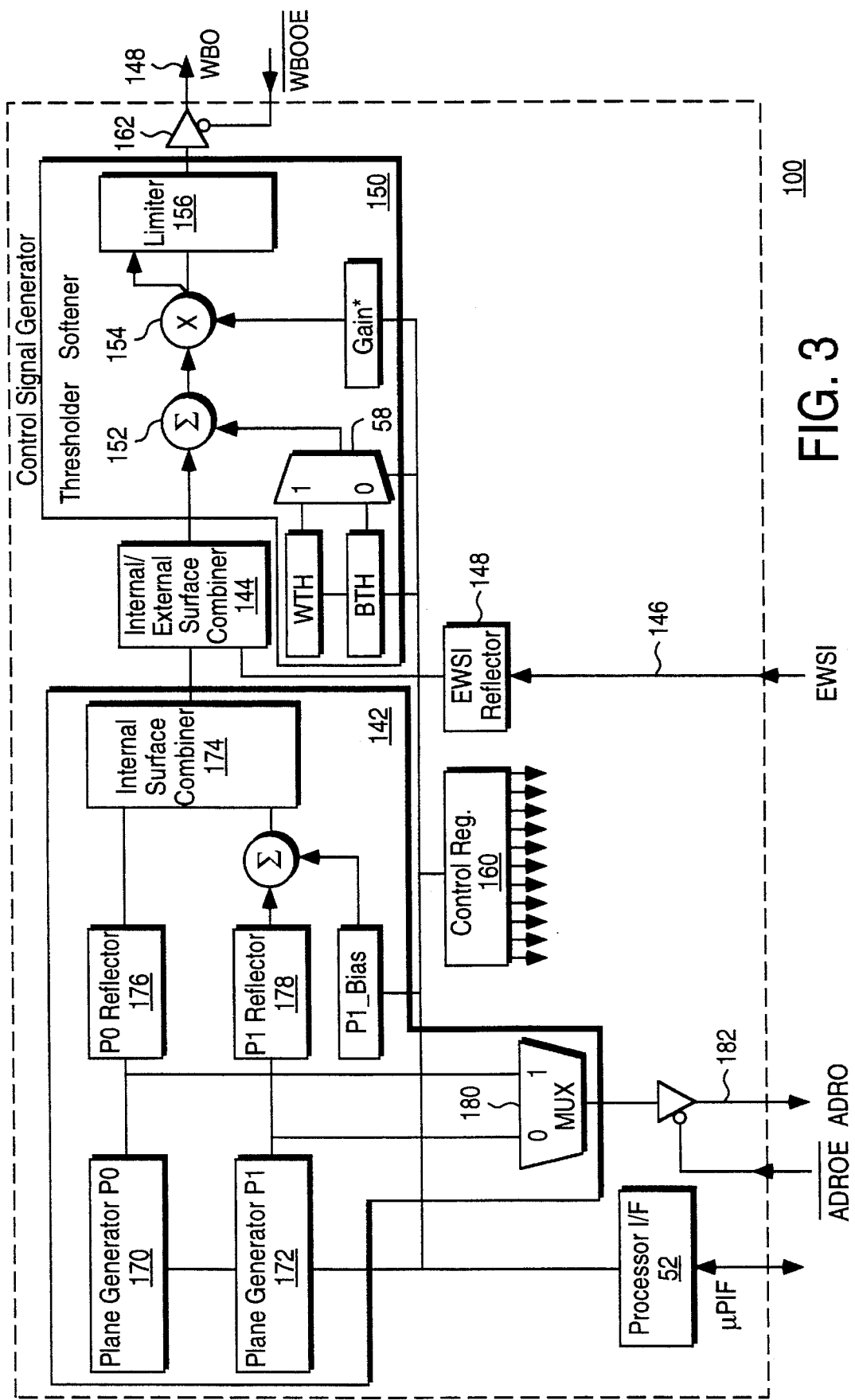
FIG. 3 is a block diagram of a video mixer control signal generator modular element in accordance with a preferred embodiment of the present invention.

FIG. 3 is a block diagram of a modular element 100 in accordance with a preferred embodiment of the present invention. As discussed above, a control signal generator 150 is included within the modular element 100. The control signal generator 150 is equivalent to the control signal modular element 50 shown in FIG. 2. An output port 148 of the modular element 100 is equivalent to the output port 48 of the modular elements 40a–40n, but the control signal is provided to the output port 148 in place of the combined wipe surface provided to the output port 48. The output terminal 148 may be selectively enabled and disabled from outputting a combined wipe surface by a tristate buffer 162 at the output terminal 148.

An internal surface generator 142, which is equivalent to the internal wipe surface generators 42a–42n shown in FIG. 2, contains two individual plane generators 170, 172.

The function:

$$f(x,y)=z=Ax+By+C \qquad (1)$$

is a fundamental expression upon which plane generators are based. If (x, y, z) are interpreted as space coordinates then f(x, y) is a plane. A, B, and C are parameters that determine the spatial orientation of the plane in the (x, y, z) coordinate system. In this space (x, y, 0) is defined as the plane in which the display device is located, and pixels in a video image are discrete points on this xy0 plane. An array of values referenced by a pair of integer indices (i, j) defines the pixels on the plane. That is, discrete points on the plane z=f(x, y) are calculated only at the pixel positions (i, j). The discretized plane function can be written:

$$P(i,j)=Ai+Bj+C \qquad (2)$$

Each plane generator produces a value at each pixel position (i, j). The generators produce independent planes whose orientations are determined by independent coefficient sets of A, B, and C. The coefficient sets are provided to the plane generators 170, 172 via the microprocessor interface 52.

An internal surface combiner 174 is for combining the plane surfaces generated by the plane generators 170, 172. Similar to the internal/external surface combiner 44 described above, the internal surface combiner 174 may operate in one of a number of modes for combining the generated plane surfaces.

Figure 1A:
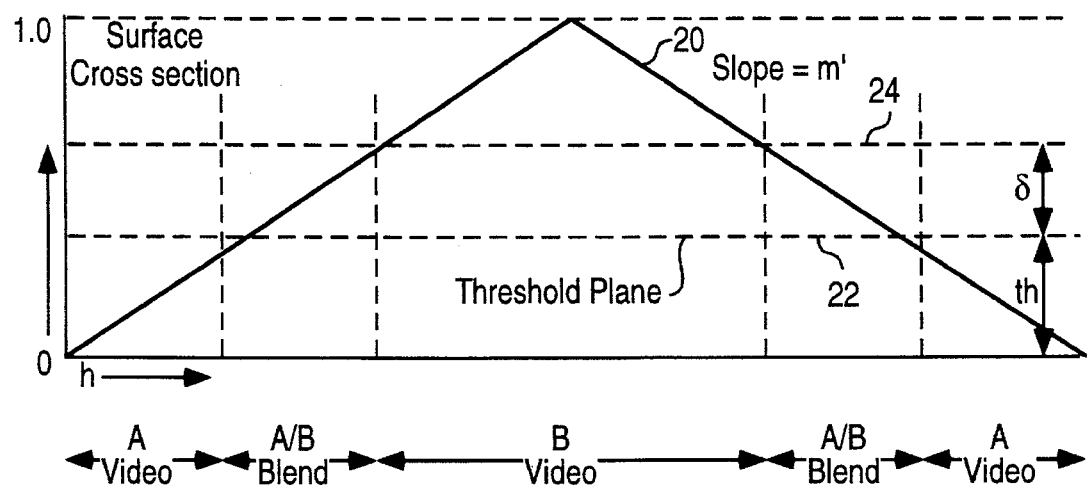
FIG. 1A is an example of a wipe surface.
Figure 1B:
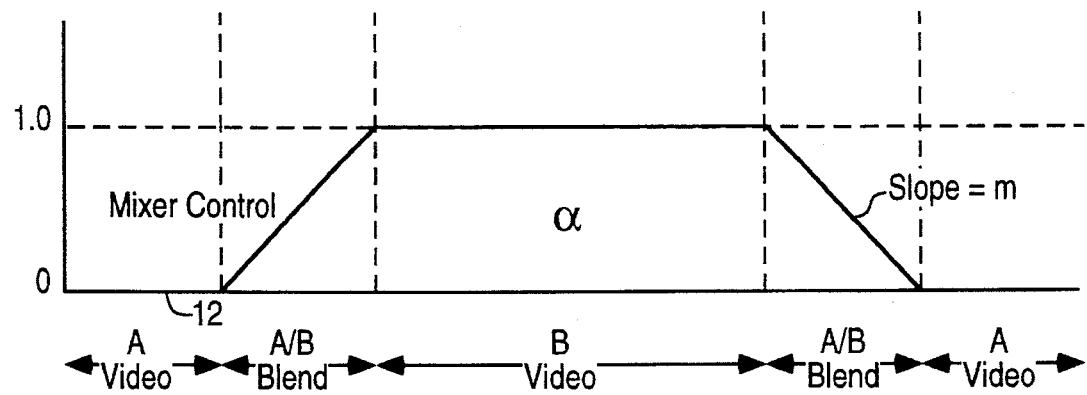
FIG. 1B shows the video mixer control surface which would be generated from the wipe surface of FIG. 1A.

For each plane generator 170, 172 a plane surface reflector 176, 178 may be provided, interposed between the particular plane generator and the internal surface combiner 174. Thus, a plane surface generated by one of the plane generators 170, 172 may be reflected to produce a reflected plane surface which has the appearance of a tent. The surface 20 shown in FIG. 1A is such a "tent surface."

Similarly, an "EWSI" reflector 148 may be provided between the EWSI 146 (which is equivalent to the EWSI's 46a–46n) and the external/internal surface combiner 144 (which is equivalent to the external/internal surface combiners 44a–44n) to reflect the external surface input via the EWSI 146.

A multiplexer 180 multiplexes the planes generated by the plane generators 170, 172 onto an address output (ADRO) output terminal 182. Because some commonly required wipe surfaces, e.g. circular wipe surfaces, cannot be rendered by planes, the plane generators 170, 172 can be programmed to provide display device coordinates out the ADRO output terminal 182, and these display device coordinates can be passed to another device. That is, the plane generators can drive other non-planar surface generating circuits, and these non-planar surfaces can be brought into another modular element for additional wipe surface processing. The ADRO output terminal is enabled and disabled depending on the state of the signal ADROE.

For example, to provide a circular wipe surface, the display device coordinates can be passed from a plane generator to another device known as a cordic transformer. The TMC2330, made by Raytheon, is an example of a cordic transformer. The cordic transformer converts rectangular Cartesian coordinates into polar (r, θ) format. If the center of the screen is defined as the origin of the Cartesian (rectangular coordinate) plane, then the r value is an inverted cone surface centered over the display device, and a cross-section of the cone is a circle. This r surface can be brought back into the EWSI port of another modular element and further processed.

In the preferred embodiment of FIG. 3, a control register 160 is assumed to connect to hardware elements such as the internal surface combiner 174 and the internal/external surface combiner 144 to allow mode switching via the microprocessor interface 152.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A wipe generator modular element, comprising:

internal wipe surface generation means for internally generating an internally generated wipe surface;

external wipe surface receiving means for receiving an externally generated wipe surface;

internal/external surface combiner means for combining said internally generated wipe surface with said externally generated wipe surface to produce a combined wipe surface; and output terminal means for providing said combined wipe surface from said wipe generator modular element whereby a complex wipe surface may be generated by combining a plurality of said modular elements.

2. A wipe generator modular element, comprising:

internal wipe surface generation means for internally generating an internally generated wipe surface;

external wipe surface receiving means for receiving an externally generated wipe surface;

internal/external surface combiner means for combining said internally generated wipe surface with said externally generated wipe surface to produce a combined wipe surface; and output terminal means for providing said combined wipe surface from said wipe generator modular element;

wherein said internal wipe surface generation means comprises:

a plurality of plane surface generator means, each of said plurality of plane surface generator means for generating a plane surface responsive to a plurality of associated plane generation parameters; and an internal surface combiner means for combining said plane surfaces to obtain said internally generated wipe surface whereby a complex wipe surface may be generated by combining a plurality of said modular elements.

3. A wipe generator modular element as in claim 2, further comprising:

plane parameter register means for holding said plane generation parameters; and processor interface port means connectable to an external processor for supplying said plane generation parameters to said plane parameter register means.

4. A wipe generator modular element as in claim 2, further comprising:

an address out terminal means wherein said internal wipe surface generation means further comprises a multiplexer for multiplexing said plane surfaces onto said address out terminal means.

5. A wipe generator modular element as in claim 2, wherein said internal wipe surface generation means further comprises:

one or more plane surface reflectors, each of said plane surface reflectors interposed between a separate associated plane generation means and said internal surface combiner, for reflecting said plane surface generated by said associated plane generation means and providing said reflected plane surface to said internal surface combiner.

6. A wipe generator modular element, comprising:

internal wipe surface generation means for internally generating an internally generated wipe surface;

external wipe surface receiving means for receiving an externally generated wipe surface;

internal/external surface combiner means for combining said internally generated wipe surface with said externally generated wipe surface to produce a combined wipe surface;

output terminal means for providing said combined wipe surface from said wipe generator modular element; and control signal generation means interposed between said internal/external surface combiner means and said output terminal means for generating video mixer control signals responsive to said combined wipe surface and providing said video mixer control signals at said output terminal means rather than said combined wipe surface.

7. A wipe generator modular element as in claim 6, wherein said control signal generation means comprises:

thresholding means for shifting said combined wipe surface to produce a thresholded combined wipe surface.

8. A wipe generator modular element as in claim 7, wherein said thresholding means comprises:

surface shifter means for shifting said combined wipe surface responsive to a thresholding shift value to produce said combined wipe surface;

one or more threshold registers, each threshold register for holding a separate threshold value; and a threshold value selector for alternately supplying said threshold values from said threshold registers to said surface shifter means as said thresholding shift value.

9. A wipe generator modular element as in claim 8, further comprising:

processor interface port means connectable to an external processor for supplying said threshold values to said threshold registers.

10. A wipe generator modular element as in claim 7, wherein said thresholding means shifts said combined wipe surface by subtracting said threshold value from said combined wipe surface.

11. A wipe generator modular element as in claim 7, wherein said control signal generation means further comprises:

softening means interposed between said thresholding means and said output terminal for scaling said thresholded combined wipe surface responsive to a gain value to produce a scaled thresholded combined wipe surface.

12. A wipe generator modular element as in claim 11, wherein said softening means scales said combined wipe surface by multiplying said surface by said gain value.

13. A wipe generator modular element as in claim 11, wherein said softening means further comprises a gain register for storing said gain value.

14. A wipe generator modular element as in claim 13, further comprising:

processor interface port means connectable to an external processor for supplying said gain value to said gain register.

15. A wipe generator modular element as in claim 11, wherein said control signal generation means further comprises:

limiter means interposed between said softening means and said output terminal for bounding said scaled thresholded combined wipe surface to a predetermined range of values to produce a limited scaled thresholded combined wipe surface.

16. A wipe generator modular element as in claim 15, wherein said predetermined range of values is 0.0 to 1.0.

17. A wipe generator modular element comprising:

internal wipe surface generation means for internally generating an internally generated wipe surface;

external wipe surface receiving means for receiving an externally generated wipe surface;

internal/external surface combiner means for combining said internally generated wipe surface with said externally generated wipe surface to produce a combined wipe surface;

output terminal means for providing said combined wipe surface from said wipe generator modular element; and external wipe surface reflecting means interposed between said external wipe surface receiving means and said internal/external surface combiner means for reflecting said external wipe surface received by said external wipe surface receiving means and providing said reflected external wipe surface to said internal/external surface combiner means.

18. A wipe generator modular element, comprising:

internal wipe surface generation means for internally generating an internally generated wipe surface;

external wipe surface receiving means for receiving an externally generated wipe surface;

internal/external surface combiner means for combining said internally generated wipe surface with said externally generated wipe surface to produce a combined wipe surface; and output terminal means for providing said combined wipe surface from said wipe generator modular element;

wherein said internal wipe surface generation means comprises:

a first plane generator means for generating a first plane surface responsive to a first set of associated plane surface generation parameters; and a second plane generator means for generating a second plane surface responsive to a second set of associated plane surface generation parameters; and an internal surface combiner means for combining said plane surfaces to obtain said internally generated wipe surface wherein said internal surface combiner means operates in one of at least three modes of operation responsive to a mode value in a control register:

mode 1: said internally generated wipe surface is said first plane surface;

mode 2: said internally generated wipe surface is the maximum of said first plane surface and said second plane surface; and mode 3: said internally generated wipe surface is the minimum of said first plane surface and said second plane surface whereby a complex wipe surface may be generated by combining a plurality of said modular elements.

19. A video mixer control signal generator system, comprising:

a plurality of cascaded wipe signal generator modular elements, each wipe generator modular element comprising:

internal wipe surface generation means for internally generating an internally generated wipe surface;

external wipe surface receiving means for receiving an externally generated wipe surface;

internal/external surface combiner means for combining said internally generated wipe surface with said externally generated wipe surface to produce a combined wipe surface; and output terminal means for providing said combined wipe surface from said wipe generator modular element, said video mixer control signal generator system further comprising control signal generating means for generating a video mixer control signal from said combined wipe surface.

* * * * *